United States Patent
Head et al.

(10) Patent No.: US 9,054,615 B2
(45) Date of Patent: Jun. 9, 2015

(54) METHOD AND APPARATUS FOR CONTROL OF A SYNCHRONOUS PERMANENT MAGNET MOTOR, PARTICULARLY OVER A LONG CABLE IN A WELL

(75) Inventors: Philip Head, Surrey (GB); Hassan Mansir, Maidenhead (GB)

(73) Assignee: AccessESP UK Limited, Knyvett House Watermans Business Park, The Causeway, Staines, Surrey (GB)

( * ) Notice: Subject to any disclaimer, the term of this patent is extended or adjusted under 35 U.S.C. 154(b) by 195 days.

(21) Appl. No.: 13/811,418

(22) PCT Filed: Jul. 22, 2011

(86) PCT No.: PCT/GB2011/051402
§ 371 (c)(1),
(2), (4) Date: Feb. 26, 2013

(87) PCT Pub. No.: WO2012/010908
PCT Pub. Date: Jan. 26, 2012

(65) Prior Publication Data
US 2013/0147410 A1    Jun. 13, 2013

(30) Foreign Application Priority Data

Jul. 22, 2010    (GB) .................................. 1012321.4

(51) Int. Cl.
| | |
|---|---|
| H02P 6/00 | (2006.01) |
| H02P 6/20 | (2006.01) |
| H02P 23/00 | (2006.01) |
| H02P 25/02 | (2006.01) |
| H02P 27/04 | (2006.01) |
| H02P 1/52 | (2006.01) |

(52) U.S. Cl.
CPC ............ *H02P 6/205* (2013.01); *H02P 23/0081* (2013.01); *H02P 25/021* (2013.01); *H02P 27/047* (2013.01); *H02P 1/52* (2013.01)

(58) Field of Classification Search
USPC .............................................. 318/400.42, 700
See application file for complete search history.

(56) References Cited

U.S. PATENT DOCUMENTS

| | | | |
|---|---|---|---|
| 3,723,840 A | 3/1973 | Opal et al. | |
| 4,791,341 A * | 12/1988 | Brown et al. ................. | 318/809 |
| 6,124,697 A | 9/2000 | Wilkerson | |
| 2002/0195988 A1* | 12/2002 | LeDoux et al. ............... | 318/798 |
| 2009/0146592 A1 | 6/2009 | Tobari et al. | |
| 2009/0256519 A1* | 10/2009 | Yohanan et al. .............. | 318/808 |
| 2011/0050144 A1* | 3/2011 | Knox et al. ................... | 318/490 |
| 2011/0050145 A1* | 3/2011 | Plitt et al. ..................... | 318/490 |

FOREIGN PATENT DOCUMENTS

| | | |
|---|---|---|
| JP | 2001-025282 A | 1/2001 |
| JP | 2001-025285 A | 1/2001 |
| WO | WO2009093214 A2 | 7/2009 |

OTHER PUBLICATIONS

International Search Report, PCT/GB2011/051402, Mailed Mar. 15, 2013, Completed Feb. 25, 2013, Sorin Gusia, Authorized Officer.
Written Opinion of the ISR, PCT/GB2011/051402, Mailed Mar. 15, 2013, Sorin Gusia, Authorized Officer.
Int'l Preliminary Report on Patentability PCT/GB2011/051402, Mailed Mar. 15, 2013, Sorin Gusia, Authorized Officer.
Search Report for GB 1012321.4 dated Nov. 22, 2010.

* cited by examiner

*Primary Examiner* — Kawing Chan
(74) *Attorney, Agent, or Firm* — Greenberg Traurig LLP

(57) ABSTRACT

A synchronous permanent magnet motor is controlled independently of position sensing means by determining the system parameters including the motor impedance and back-emf and the cable impedance and supplying power according to a predefined voltage:frequency ratio which is determined based on said system parameters to provide a desired rate of acceleration determined by the supply voltage.

20 Claims, 2 Drawing Sheets

METHOD AND APPARATUS FOR CONTROL OF A SYNCHRONOUS PERMANENT MAGNET MOTOR, PARTICULARLY OVER A LONG CABLE IN A WELL

This application claims priority to and the benefit of PCT International Application Number PCT/GB2011/051402, filed on Jul. 22, 2011, and GB 1012321.4 filed Jul. 22, 2010, the disclosures of which are incorporated herein by reference in their entireties.

BACKGROUND OF THE INVENTION

1. Field of the Invention

This invention relates to the control of synchronous permanent magnet motors, particularly though not exclusively in a downhole environment such as a hydrocarbon (oil, gas, or mixed oil and gas) well.

2. Description of the Related Art

Permanent magnet motors are anticipated to replace the standard induction motor in downhole ESP applications. Due to their power density compared to current technologies and to their high efficiency due their built in excitation, it is expected that they will competing more and more with induction motor based ESP systems.

Brushless permanent magnet motors conventionally comprise a rotor having permanent magnets, and a stator winding which induces the rotor to turn. The motor is supplied with current, which is electronically commutated to energise different parts of the winding as the rotor turns.

Conventional art as exemplified by US 2009/0146592 A1 and JP 2001025282 relies upon closed loop control methods to start and operate a synchronous motor. These involve either direct measurements or estimation of control quantities like position from directly measurable quantities like voltages and currents.

In order to control the rotor, the rotor position is determined. This can be a position sensor to coordinate the variable speed drive device switching with the position of the motor back-EMF. This typically requires a Hall effect device based position sensor, a resolver or encoder to provide three signals shifted 120° that are used by the variable speed drive (VSD) to time the signals to the devices. Due to the harsh nature of the environment, these position sensors are not reliable and may not survive the prevailing well temperature. Alternatively sensorless algorithms have been developed which deduce the rotor position from the motor back emf, which however can be very unreliable at motor start up and at low speeds if the motor is under load.

A synchronous motor runs at the same speed as the supply frequency to its armature. The actual speed in revolution per minute (rpm) is a function of supply frequency and the number of pole pairs of the field. Unlike asynchronous motors, synchronous motors require a start-up sequence to ensure that the rotor gains speed without locking. Direct on-line starting methods seldom work on synchronous machines. The amount of torque to be generated by the interaction of the field with the armature current depends on the magnitude of the rotor field and the stator currents. It is the interaction between these fields that generates the torque required to accelerate the rotor and supply the torque required by the load. Ideally these fields must be in quadrature (90 Electrical Degrees) to maximize the torque generation. So for a successful start, the amount of current supplied to the stator has to be adequate and the rate at which the motor is accelerated needs to be consistent with the torque generated. Conventionally, there are two ways to do this, both being closed-loop methodologies:

(i) A physical position sensor is provided, and maximum torque is ensured by maintaining a 90° angular relationship between the rotor field and armature currents. In ESP applications, the distance of the position sensor, for example, some 3000 m from the drive is prohibitive and furthermore the reliability of such systems is reduced by the addition of additional devices and associated cables.

The position sensor means indicates when the switches and open or closed to supply stator currents, and typically comprises either a Hall effect sensor or a group of optical devices positioned 120° apart. The signals from the three sensors are used to generate the gating signals. In such systems, the current level is controlled to set the torque level so thus acceleration.

(ii) Alternative, sensorless methods make use of direct measurements of voltage and current and from the voltage equation estimate the position by integration methods. Such methods are difficult to use in ESP systems, primarily because of the long cables between the motor and the drive and the fact that in the majority of cases cable impedances are non-symmetrical due to the flat configuration of the cable, which is typically supported by strapping it to the production tubing. The voltages and current are therefore no longer balanced and therefore estimation methods are no longer accurate. Position errors therefore lead to lower stability margin of the system and may lead to the motor losing synch during transients or when there is gas in the well and the motor loses load momentarily.

It is an object of the present invention to provide a more satisfactory way of controlling a synchronous permanent magnet motor, particularly in downhole applications where the conductors are of great length.

SUMMARY OF THE INVENTION

Accordingly in its various aspects the present invention provides a method and system as defined in the claims.

In accordance with an embodiment, a method of controlling an electric power supply to a synchronous permanent magnet motor having a plurality of windings so as to accelerate the motor through a range of speed from rest, comprising:

supplying each winding with a root mean square supply voltage V applied at a supply frequency f via a respective conductor according to the expression $$V = V0 + vf\_Ratio * f$$

wherein V0 is an initial constant voltage, vf_Ratio is a constant ratio of voltage over frequency, V0 being sufficient to supply sufficient current to generate the required torque to turn the motor from stationary, and the vf_Ratio being sufficient to ensure excess torque is available during the start-up period and during operation to overcome any transient load that may be present, and the power supply is controlled independently of any rotor position signal.

In accordance with another embodiment, a method of controlling an electric power supply to a synchronous permanent magnet motor driving a load and having a plurality of windings, each winding being supplied with power at a root mean square supply voltage V3 and a supply frequency via a respective conductor, so as to accelerate the motor through a range of speed from rest, comprising:

determining system parameters including characteristics of the load, the impedance and back-emf of the motor and the impedance of each of the conductors;

determining based on said system parameters a root mean square first voltage V0 at which the supply generates torque in the motor at rest sufficient to start the motor in rotation;

determining based on said system parameters a ratio between the supply voltage V3 and supply frequency, wherein the ratio defines, for each of a range of supply frequencies corresponding to the range of speed of the rotating motor, a root mean square second voltage V2 at which current flowing through each winding increases with both increase and decrease in voltage, and V2>V0;

supplying power to each winding at the first voltage V0 so as to start the motor from rest;

and progressively increasing both the supply voltage and the supply frequency while maintaining the supply voltage V3 with respect to supply frequency at a value sufficiently in excess of V2 to ensure stable operation of the motor until the motor has reached a desired operating speed;

wherein the said ratio between the supply voltage V3 and supply frequency is determined based on said system parameters to provide a desired rate of acceleration determined by the supply voltage.

In accordance with another embodiment, a system comprises:

a synchronous permanent magnet motor deployed in a wellbore and driving a load and having a plurality of windings, and a control apparatus for supplying each winding with power at a root mean square supply voltage V3 and a supply frequency via a respective conductor, wherein the control apparatus is configured to supply each winding with a root mean square supply voltage V applied at a supply frequency f via a respective conductor according to the expression $$V=V0+vf\_Ratio*f$$

wherein V0 is an initial constant voltage, vf_Ratio is a constant ratio of voltage over frequency, V0 being sufficient to supply sufficient current to generate the required torque to turn the motor from stationary, and the vf_Ratio being sufficient to ensure excess torque is available during the start-up period and during operation to overcome any transient load that may be present, and the power supply is controlled independently of any rotor position signal.

The motor may be arranged to drive an electric submersible pump, particularly a pump comprising a centrifugal impeller driven by the motor.

The system is particularly advantageous where each conductor is at least 50 m in length, still more where each conductor is at least 600 m in length, yet more where each conductor is at least 3000 m in length.

BRIEF DESCRIPTION OF THE DRAWINGS

Further features and advantages will be apparent from the illustrative embodiment of the invention which will now be described, purely by way of example and without limitation to the scope of the claims, and with reference to the accompanying drawings, in which:

DETAILED DESCRIPTION

Figure 1B:
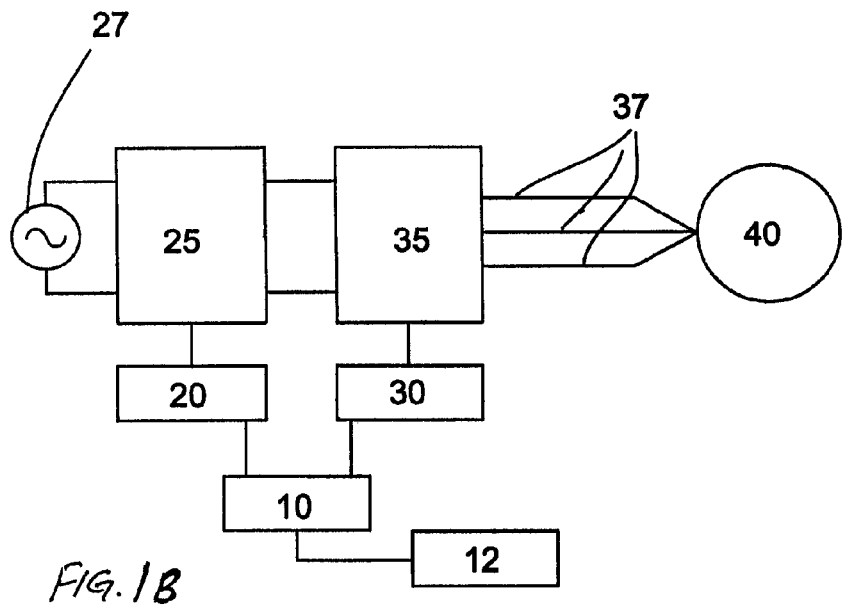
FIG. 1B is a diagrammatic view of the motor control system.
Figure 1A:
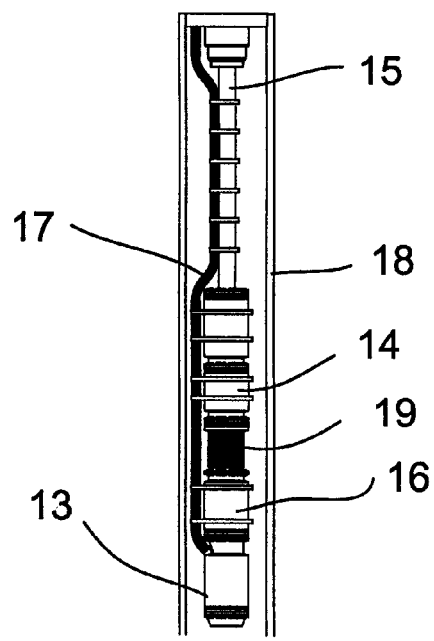
FIG. 1A is a side view of a motor disposed in a well and controlled by a control system.

Referring to FIG. 1A, an electric submersible pump comprises a pump 14 powered by an electric motor 13 via a gearbox 16, which is lowered down a cased well 18 on, for example, coiled tubing 15. An electric cable 17 extends from the surface to supply the motor with electricity. The pump 14 draws well fluid in through an inlet 19 and into the coiled tubing 15. In a downhole application such as this, particularly where the motor is powered using a long cable, a brushless DC motor having the following described control system is ideal. The long cable could alternatively be attached to the casing of the well, so that the ESP mates with an electrical connector when it reaches the desired destination.

Systems of this type are typically supplied with power from a 3-phase AC source. The AC voltages are converted to DC by a rectifier that is supported by capacitors to ensure ripple free DC output, also called a DC-Link. It is from this DC-Link that the voltages supplied to the motor are generated, typically by Pulsed Width Modulation (PWM) techniques but alternatively by simpler methods such as six-step or a combination of PWM and six-step, referred to as a hybrid method.

Referring to FIG. 1B, a microcontroller 10 controls a voltage control unit 20 and a pulse-width modulation controller unit 30. Power 27 is supplied and rectified in a rectification unit 25, before fed to windings of the stator of the permanent magnet motor 40 by switching unit 35. The rectification unit also supplies power at the steady voltage maintained by the voltage control unit 20, and the switching unit 35, under the control of the pulse-width modulation controller unit 30, supplies a number of windings (not shown) via supply lines 37 so that the poles (also not shown) of the permanent magnets on the rotor are attracted and/or repelled by the windings so that the rotor is caused to turn. The pulse-width modulation controller unit 30, and ultimately the microprocessor 10 controls the frequency with which the windings are switched on and off, each winding having the same frequency but out of phase with the other windings. The microprocessor 10 responds to an input 12, which may be either an on-off signal for the motor to operate at a predetermined speed, or a speed at which the motor is to rotate.

The motor 40 is a synchronous permanent magnet brushless AC motor which is electronically commutated (i.e. supplied with an appropriate waveform so as to intermittently excite each of its windings) by insulated gate bipolar transistor switches within the switching unit 35.

The pulse width modulation controller unit 30 provides both frequency and voltage control by switching the supply so as to provide pulses (e.g. a sinusoidal or square wave supply) to each winding and determining the frequency of that supply, and defining the width of the DC pulses so as to define the root mean square voltage.

The voltage control unit 20 operates in a conventional way to ensure a constant, ripple free DC supply from the rectifier 25 to the switching unit 35. Since the pulse width modulation controller unit 30 controls both the magnitude and the frequency of the voltage supplied to the motor windings, in a simplified system the voltage control unit 20 may be dispensed with, whereby the rectification unit 25 may then comprise a passive rectifier.

Figure 2:
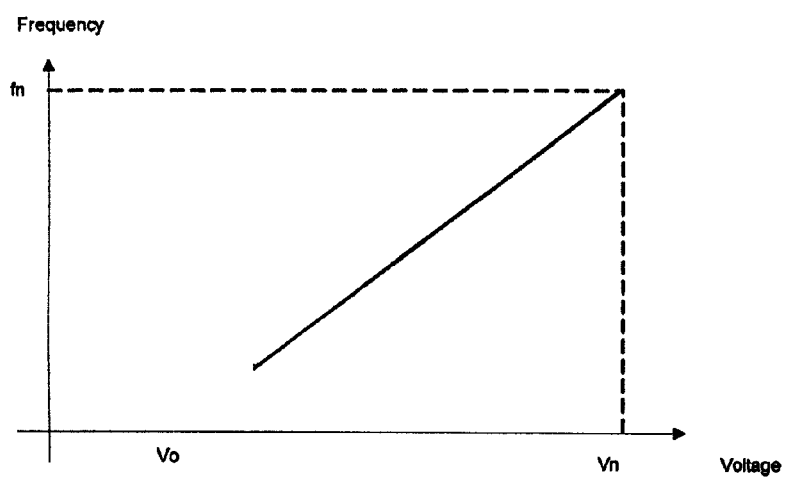
FIG. 2 is a graph showing the voltage:frequency (V:f) ratio.

Referring also to FIG. 2, the microprocessor controls the voltage V supplied to a winding and the frequency f at which the supply is switched on and off in a relationship shown, and which also expressed $$V=V0+vf\_Ratio*f$$

where V0 is an initial constant voltage, vf_Ratio (elsewhere indicated as V:f ratio) is the ratio of voltage over frequency (i.e. Vn/fn).

The motor operates in synchronous mode. The initial voltage setting V0 is selected to ensure that there is enough current to generate the required torque to start-up the motor. Similarly, the slope of the V–f relationship is selected to ensure excess torque is available during the start-up period and during operation to overcome any transient load that may be present while maintaining current below limits.

The motor is operated in synchronous mode using a voltage to frequency ramp which is selected to ensure that optimal excess torque is present during the start-up period.

Figure 3:
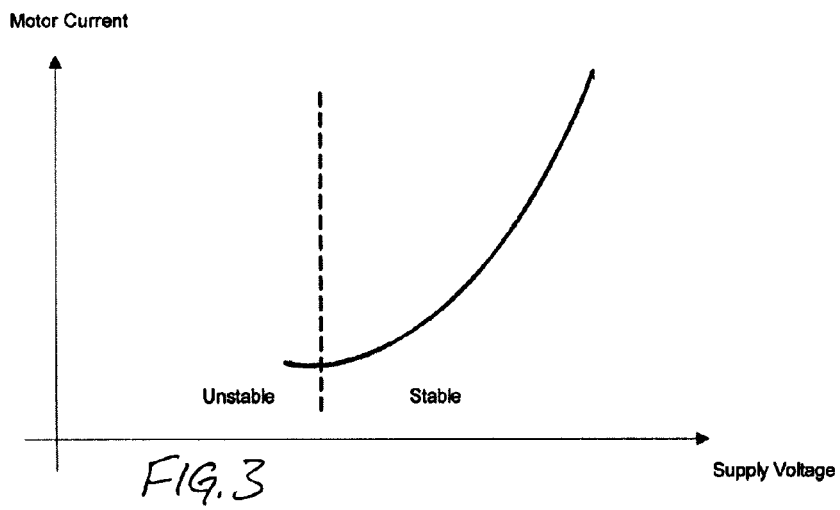
FIG. 3 is a graph showing the motor current:supply voltage (I:V) relationship at one frequency.

Referring to FIG. 3, the voltage V for full speed operation is set to ensure the motor operates in the stable region. Operation at the left hand side of the minimum current in FIG. 3 makes the motor vulnerable to loss of synchronism under momentary load transients.

The acceleration time (the time it takes the motor to reach full operating speed from a stationary position) and thus the acceleration rate is selected to ensure adequate start time within the operational requirements of the equipment in the field to preserve the life of the equipment.

It will be seen that providing V0 and vf_Ratio are sufficient, no sensor circuitry is required.

In a preferred embodiment, the novel method is applied to an electrical submersible pump system that includes a motor driving a centrifugal pump and a power supply cable that can be in excess of 600 m and typically in the range of 3000 m to 7500 m. As the drives used to control such ESP systems are typically low voltage, a step-up isolation transformer between the drive circuit and the motor is sometimes necessary (represented by Isolation Tx in the embodiment shown in FIG. 5). The use of such devices as isolation transformers makes conventional startup and operation of motors in such application even harder due to the loss of phase information across the transformer. The novel method is advantageously immune to loss of phase information as the current is inherently set by the magnitude of the voltage supply at a given frequency.

In contrast to the conventional art, the novel method is fully open loop and does not rely on direct sensing of the motor parameters in operation, but instead on intimate knowledge of the motor characteristics of impedance and back-emf and also on the supply cable characteristics, all of which may readily be determined from specifications and by conventional measurement techniques in the field, preferably before deployment in the well or other use situation. In this way the start parameters of the system are established, wherein the start characteristics comprise an initial voltage and a ramp. The principal parameters required to establish the start characteristics are motor impedances and back-emf, and cable impedance. The voltage at a given frequency is set to generate stator currents that are enough to generate torque for acceleration and load with margin to cater for transient loads. The initial voltage is set to generate enough current at standstill to generate enough torque to overcome any bearing friction. The voltage is set in a predetermined way and programmed into the drive, and the voltage as a function of frequency is determined from the motor and cable characteristics. The equation that governs operation is thus predetermined based on motor and cable characteristics and incorporated into the drive system as a hardware or software component.

At a given frequency or motor speed, the voltage applied to the motor acts against the back-emf generated on the motor at that speed. The resulting current is a result of the difference between the supply voltage and back-emf applied to the impedance of the motor and cable. Therefore, the level of current is set by the level of voltage applied to the motor. As the level of torque at a given speed is a fixed quantity, the component of the current that would generate the required torque in conjunction with a given back-emf is also fixed. Therefore, the level of voltage supply is important. Too much voltage will generate current in excess with what is required so leading to much reactive power contributing to the motor heating. Too little voltage will not generate the required current so the motor with drop out of step. So there is a fine balance to be reached for a given motor/cable system. This balance is achieved by determining the system parameters and then maintaining the V:f relationship as set forth herein.

Figure 5:
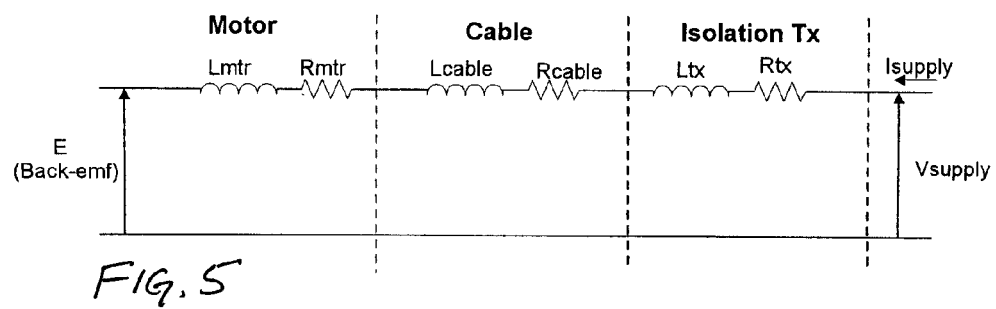
FIG. 5 is a equivalent circuit diagram representing the motor and cable together with an isolation transformer.

A simplified per-phase equivalent circuit of a motor system is shown in FIG. 5. As stated above, the motor is characterized by its back-emf and its inductance and resistance. The cable is characterised by its impedance which is a function of conductor gauge, length and lay-up. The back-emf E is a function of speed and it is constant at a given speed. The component of current that is in phase with the back emf is the component that generates the torque. The component of the current that is perpendicular to back-emf generates reactive power which circulates. Some of this current is necessary as it accounts for the reactive drop in the motor and cable inductance and any excess beyond a small amount is only generated as power ($I^2R$) losses and does not contribute to torque generation. It is therefore clear that the supply voltage has to be selected to within a narrow range to supply the torque, the reactive drop and a small margin to cover for increased torque required during transients.

Based on the equivalent circuit (FIG. 5), it is possible to determine the characteristics of the motor current as a function of voltage at a given supply frequency i.e. motor speed. As illustrated in FIG. 3, for a given frequency supply, the phase rms current as a function of supply voltage follows a square law with a minimum current encountered at a specific voltage level.

This is due to the complex nature of what is taking place within the machine. The motor and associated cables are characterized by a complex impedance made out by the resistance and inductance. For a given frequency this quantity is constant: $Z=R+jwL$. Simply put the current is: $I=(V-E)/Z$, all of these being vectorial or complex quantities. It is the vectorial difference between the supply voltage and back-emf that drives the current.

The other fixed quantity is the back-emf of the motor as it is proportional to speed. The current magnitude and angular relationship to the supply voltage V and back-emf E (FIG. 5) are all dependent of the magnitude of the voltage V applied at a given frequency. The real component of the current Isupply is fixed and driven by the torque required to drive the load at that given frequency. There are voltage supply conditions where the phase relationship between V and E result in increasing current while the supply voltage is reduced.

In a preferred embodiment, the load is a centrifugal pump with characteristics where the load torque is the square of the speed and the power is cubic law of the speed. The permanent magnet synchronous machine is capable of developing constant torque when supplied with constant current at any speed.

Due to this characteristics, permanent magnet synchronous machines are well suited to accelerate load with square law as a function of speed.

It is clear that at the right hand side of the motor current: supply voltage (I:V) curve of FIG. 3, the motor is inherently stable as the voltage supply is adequate to supply the required current. However, it is clear also that going up the curve is not necessary as it generate more current than required without additional benefits. Operating at close proximity to the minimum under all operating conditions is optimal for system operation and efficiency.

Figure 4:
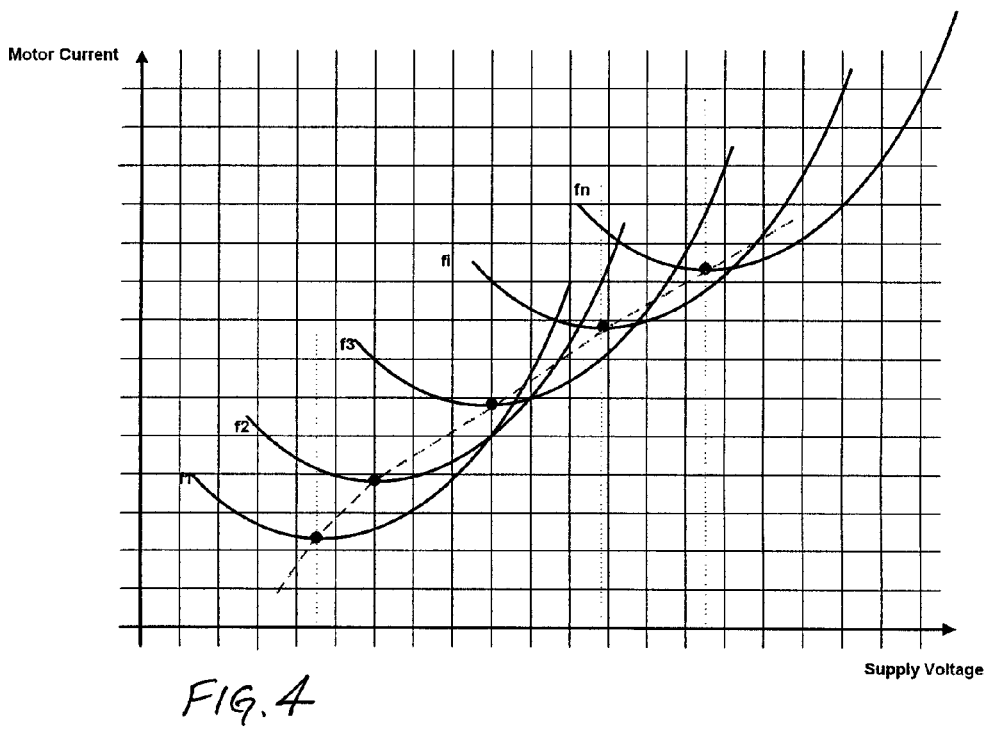
FIG. 4 is a graph showing the motor current:supply voltage (I:V) relationship at five frequencies corresponding to the range of speed of the motor.

FIG. 4 shows a plurality of I:V curves, each representing a different frequency in the frequency range of the supply to the motor, corresponding to the speed range of the motor, wherein the locus of the respective optimal operating points of each of the I:V curves is represented by the broken line.

The voltage:frequency (V:f) ratio, represented in FIG. 2, may be a single value or may be a piecewise linear function. The single value to be used is selected based on the location of the locus of the minimum currents (FIG. 4). This value needs to ensure that at any frequency point between the start frequency and the end frequency, the operating point is always at least slightly at the right hand side of the locus as shown in FIG. 4 and hence in the region of stable operation of the motor.

The V:f ratio is a constant quantity that is derived from the required acceleration of the system balanced by the need to cool the motor. As the cooling to the motor is provided by the pumped fluid, the acceleration and current levels must be balanced to ensure that the pumped fluid can cool the amount of losses generated during acceleration period.

The equation can be stated as:

$$V[\text{supplied to winding}] = C1 + C2 * f$$

wherein both C1 and C2 are constants

C2 is the ratio of Vn and fn (FIG. 2) where Vn is nominal root mean square (RMS) voltage at nominal speed and fn is the supply frequency at nominal speed.

Supply frequency is stated in Hz and is related to speed and motor pole pairs as follows:

$$f = (\text{rpm} * \text{Pole Pairs})/60$$

The invention may advantageously be employed in ESP systems with synchronous permanent magnet motors, particularly those that have a cable length in excess of 50 m and that are supplied either directly from the drive or through a step-up transformer. In particular, it may advantageously be used for ESP systems wherein the motor is connected to a centrifugal pump.

The initial voltage (V0) is applied when the motor is at standstill or static condition. The current that results for this initial voltage is only limited by the resistance of the winding and the cable. Typically, an initial voltage is selected that would result in about 30% of rated current at start-up to overcome any stiction or friction. The initial voltage may be calculated by multiplying the desired current by the line resistance of the motor and its associated cable.

The I:V curve is dependent on the load conditions, whereby a set of I:V curves can be generated in accordance with the conventional art that are related to the load at a given frequency. The start characteristics are selected for the full load condition of the motor, so that the I:V curve will guarantee that the motor will start at any load condition. This provides a single characteristic that will accommodate steady-state as well as system transients.

The initial voltage (V0) inherently adds to the voltage margin to allow for acceleration and transients at start-up or at low speed. However, as the speed increases this effect of the initial voltage value reduces, and so allowance is made for the required acceleration and transients within the V:f ratio and the associated margin obtained from the I:V curves.

Although in theory one could experimentally deduce a working V:f ratio, in practice the open loop nature of the controls would make it very hazardous to specify control system parameters in this way. In accordance with the novel method, the system hardware parameters including the motor and cable characteristics reflecting in particular the cable length are measured and analysed so as to obtain the required operating profiles and the optimal operating conditions without experimentation. This is important, particularly since hydrocarbon extraction is capital intensive and it is undesirable to spend time tuning the motor control system while the motor is deployed in the well.

The desired acceleration rate to suit the operating conditions of the system can be obtained by selecting an appropriate V:f ratio (FIG. 2), whereby current is supplied to compensate for the acceleration torque in accordance with the known relationship: J.dw/dt.

The acceleration rate is dictated by the difference between the electromagnetic torque generated at the motor shaft and the load torque (comprising pump load, friction and any other losses). This difference drives the J.dw/dt thus the dw/dt or acceleration. In the novel method, the rate of acceleration is determined by the rate at which the voltage is varied as a function of time. As the electromagnetic torque is dictated by the supplied current which in turn is a result of applied voltage, it is possible to ensure sufficient current to maintain the desired acceleration by selecting a V:f ratio that is consistent with the required acceleration rate.

A simple example is as follows:

For a given frequency the voltage is fixed by the vf ratio:

$$V = V0 + vf * f$$

Supply frequency as a function of time at given acceleration rate is defined as:

$$f = \text{Acceleration Rate} * \text{time}$$

Therefore, the supply voltage is: $V = V0 + vf * \text{Accel} * \text{time}$ wherein Accel is Acceleration rate, and Total torque $(f) = $ Load Torque $(f) + $ Inertia*Accel The required torque at a given speed is augmented by providing the acceleration torque to be approximately proportional to the acceleration rate.

A faster acceleration rate may therefore be obtained by increasing the V:f ratio as required by the operating conditions of the system.

The novel method may be applied to all synchronous motors with permanent magnet excitation or current excitation. For permanent magnet motors it may be applied to both brushless-DC motors (motors with trapezoidal back-emf) and brushless-AC motors (motors with sinewave back-emf).

It will be appreciated that the foregoing example applies equally to the embodiment set forth above, whereby a method of controlling an electric power supply to a synchronous permanent magnet motor driving a load and having a plurality of windings, each winding being supplied with power at a root mean square supply voltage V3 and a supply frequency via a respective conductor, so as to accelerate the motor through a range of speed from rest, comprises determining system parameters including characteristics of the load, the impedance and back-emf of the motor and the impedance of each of the conductors; determining based on said system parameters a root mean square first voltage V0 at which the supply generates torque in the motor at rest sufficient to start the motor in rotation; determining based on said system parameters a ratio between the supply voltage V3 and supply frequency, wherein the ratio defines, for each of a range of supply frequencies corresponding to the range of speed of the rotating motor, a root mean square second voltage V2 at which current flowing through each winding increases with both increase and decrease in voltage, and V2>V0; supplying power to each winding at the first voltage V0 so as to start the motor from rest; and progressively increasing both the supply voltage and the supply frequency while maintaining the supply voltage V3 with respect to supply frequency at a value sufficiently in excess of V2 to ensure stable operation of the motor until the motor has reached a desired operating speed; wherein the said ratio between the supply voltage V3 and supply frequency is determined based on said system parameters to provide a desired rate of acceleration determined by the supply voltage.

Preferably the supply voltage V3 is maintained with respect to supply frequency at a value just sufficiently above V2 to ensure stable operation, whereby V3<1.3*V2, more preferably V3<1.2*V2, still more preferably V3<1.1*V2, although these values may be modified in practice to reflect the desired acceleration rate and system parameters (e.g. transient loads resulting from impure wellbore fluids or the like) of any given installation.

The first voltage V0 is preferably determined as that voltage at which the supply generates torque in the motor at rest slightly in excess of that required to overcome starting loads, for example, not more than 130%, more preferably not more than 120%, still more preferably not more than about 110% of that voltage at which the supply is calculated based on the system parameters to generate torque in the motor at rest just sufficient to start the motor in rotation.

In summary, a preferred embodiment provides a synchronous permanent magnet motor which is controlled independently of position sensing means by determining the system parameters including the motor impedance and back-emf and the cable impedance and supplying power according to a predefined voltage:frequency ratio which is determined based on said system parameters to provide a desired rate of acceleration determined by the supply voltage.

We claim:

1. A method of controlling an electric power supply to a synchronous permanent magnet motor within a wellbore having a plurality of windings so as to accelerate the motor through a range of speed from rest, comprising:
   supplying each of the plurality of windings of the synchronous permanent magnet motor within the wellbore with a root mean square supply voltage V applied at a supply frequency f via a respective conductor according to an initial constant voltage V0, a constant ratio of voltage over frequency vf_Ratio, and the supply frequency f; and
   determining, prior to supplying each of the plurality of windings with the root mean square supply voltage V applied at the supply frequency f, the initial constant voltage V0 from one or more characteristics of the synchronous permanent magnet motor and one or more characteristics of the respective conductor that supplies the root mean square supply voltage V to the synchronous permanent magnet motor,
   wherein the initial constant voltage V0 is a predetermined value that is sufficient to supply a current to generate a required torque to turn the motor from a stationary position,
   wherein the constant ratio of voltage over frequency vf_Ratio is sufficient to provide excess torque for a start-up period and an operation period that overcomes a transient load, and
   wherein the power supply is controlled independently of a rotor position signal.

2. The method of claim 1, further comprising determining the constant ratio of voltage over frequency vf_Ratio by determining a minimum current value for each frequency within a range of supply frequencies that are associated with the range of speeds for the synchronous permanent magnet motor, wherein the minimum current value for each frequency within the range of supply frequencies corresponds to a locus on a current:voltage curve.

3. The method of claim 1, further comprising determining, prior to supplying each winding with the root mean square supply voltage V applied at the supply frequency f, the constant ratio of voltage over frequency vf_Ratio from the one or more characteristics of the synchronous permanent magnet motor and the one or more characteristics of the respective conductor that supplies the root mean square supply voltage V to the synchronous permanent magnet motor.

4. The method of claim 1, wherein the synchronous permanent magnet motor is arranged to drive an electric submersible pump, wherein the one or more characteristics of the respective conductor used to determine the initial constant voltage V0 comprises an impedance of the respective conductor, and wherein the impedance of the respective conductor is determined from a length of the respective conductor.

5. The method of claim 1, wherein the one or more characteristics of the synchronous permanent magnet motor used to determine the initial constant voltage V0 is selected from the group consisting of: a back-emf of the synchronous permanent magnet; an inductance of the synchronous permanent magnet motor; and a resistance of the synchronous permanent magnet motor.

6. The method of claim 1, wherein the supply frequency f is based upon a speed of the synchronous permanent magnet motor and the motor pole pairs of the synchronous permanent magnet motor.

7. A method of controlling an electric power supply to a synchronous permanent magnet motor driving a load and having a plurality of windings, each of the plurality of windings being supplied with power at a root mean square supply voltage V3 and a supply frequency via a respective conductor, so as to accelerate the synchronous permanent magnet motor through a range of speed from rest, comprising:
   determining a plurality of system parameters;
   determining based on the system parameters a root mean square first voltage V0 at which the electric power supply generates a torque in the synchronous permanent magnet motor at rest sufficient to start the synchronous permanent magnet motor in rotation;
   determining based on the system parameters a ratio between the supply voltage V3 and the supply frequency, wherein the ratio defines, for each of a range of supply frequencies corresponding to the range of speed of the rotating synchronous permanent magnet motor, a root mean square second voltage V2 at which a current flowing through each of the plurality of windings increases with both an increase and a decrease in a voltage corresponding to the root mean square second voltage V2, wherein the root mean square second voltage V2 is greater than the root mean square first voltage V0;

supplying power to each winding at the root mean square first voltage V0 so as to start the synchronous permanent magnet motor from rest; and progressively increasing both the root mean square supply voltage V3 and the supply frequency while maintaining the supply voltage V3 with respect to the supply frequency at a value sufficiently in excess of the root mean square second voltage V2 to ensure stable operation of the synchronous permanent magnet motor until the synchronous permanent magnet motor has reached a desired operating speed;

wherein the ratio between the root mean square supply voltage V3 and supply frequency is determined based on the system parameters to provide a desired rate of acceleration determined by the root mean square supply voltage V3.

8. The method of to claim 7, wherein the root mean square supply voltage V3 is maintained with respect to the supply frequency at a value whereby the root mean square supply voltage V3 is less than 1.3*the root mean square second V2.

9. The method of to claim 7, wherein the root mean square supply voltage V3 is maintained with respect to the supply frequency at a value whereby the root mean square supply voltage V3 is less than 1.2*the root mean square second V2.

10. The method of claim 7, wherein the root mean square supply voltage V3 is maintained with respect to the supply frequency at a value whereby the root mean square supply voltage V3 is less than 1.1*the root mean square second V2.

11. The method of claim 7 wherein determining the plurality of system parameters further comprises determining at least one selected from the group consisting of: a characteristic of the load; an impedance of the synchronous permanent magnet motor; a back-emf of the synchronous permanent magnet motor; and an impedance of each of the respective conductors.

12. The method of claim 7, wherein the root mean square first voltage V0 and the ratio are determined without sensing a plurality of synchronous permanent magnet motor parameters during operation.

13. The method of claim 7, further comprising increasing an acceleration rate of the synchronous permanent magnet motor by increasing the ratio, and wherein the supply frequency is regulated by a speed of the synchronous permanent magnet motor and the motor pole pairs of the synchronous permanent magnet motor.

14. A system comprising:
a synchronous permanent magnet motor deployed in a wellbore and configured to drive a load, the synchronous permanent magnet motor comprising a plurality of windings; and
a control apparatus operatively coupled to the synchronous permanent magnet motor via one or more electric cables, wherein the control apparatus is configured to:
supply each of the plurality of windings of the synchronous permanent magnet motor via the electric cables with a root mean square supply voltage V applied at a supply frequency f in relation to an initial constant voltage V0, a constant ratio of voltage over frequency vf_Ratio, and the supply frequency f;
determine, prior to supplying each of the plurality of windings with the root mean square supply voltage V applied at the supply frequency f, the initial constant voltage V0 from at least an impedance of the synchronous permanent magnet motor and an impedance of the corresponding electric cable; and
select a value for the constant ratio of voltage over frequency vf_Ratio that compensates for an acceleration torque of the synchronous permanent magnet motor,
wherein the initial constant voltage V0 is selected to generate a torque that turns the synchronous permanent magnet motor at a standstill state, and
wherein the initial constant voltage V0 and the constant ratio of voltage over frequency vf_Ratio is selected in an open loop configuration that does not rely on a direct sensing of a plurality of motor parameters corresponding to the synchronous permanent magnet motor in operation.

15. The system of claim 14, wherein the synchronous permanent magnet motor is arranged to drive an electric submersible pump.

16. The system of claim 14, wherein the control apparatus is further configured to increase an acceleration rate of the synchronous permanent magnet motor by increasing the value of the constant ratio of voltage over frequency vf_Ratio.

17. The system of claim 14, wherein the selection of the constant ratio of voltage over frequency vf_Ratio is prior to supplying each winding with the root mean square supply voltage V applied at the supply frequency f, and wherein the constant ratio of voltage over frequency vf_Ratio is determined from the at least the impedance of the synchronous permanent magnet motor and the impedance of the corresponding electric cable.

18. The system of claim 14, wherein supplying each winding via the electric cables with a root mean square supply voltage V applied at a supply frequency f in relation to an initial constant voltage V0, a constant ratio of voltage over frequency vf_Ratio, and the supply frequency f is based upon the expression V=V0+vf_Ratio*f.

19. The system of claim 14, wherein the control apparatus is further configured to determine the initial constant voltage V0 from at least a back-emf of the synchronous permanent magnet motor and an inductance of the synchronous permanent magnet motor.

20. The system of claim 14, wherein the supply frequency f is related to the speed of the synchronous permanent magnet motor and the motor pole pairs of the synchronous permanent magnet motor.

* * * * *